(12) United States Patent
Schaffner et al.

(10) Patent No.: US 8,995,838 B1
(45) Date of Patent: Mar. 31, 2015

(54) WAVEGUIDE ASSEMBLY FOR A MICROWAVE RECEIVER WITH ELECTRO-OPTIC MODULATOR

(75) Inventors: James H. Schaffner, Chatsworth, CA (US); Kevin Geary, Los Angeles, CA (US); Daniel Yap, Newbury Park, CA (US)

(73) Assignee: HRL Laboratories, LLC, Malibu, CA (US)

( * ) Notice: Subject to any disclaimer, the term of this patent is extended or adjusted under 35 U.S.C. 154(b) by 1135 days.

(21) Appl. No.: 12/959,287

(22) Filed: Dec. 2, 2010

Related U.S. Application Data (63) Continuation-in-part of application No. 12/176,114, filed on Jul. 18, 2008, now Pat. No. 8,750,709.

(51) Int. Cl.
*H04B 10/2575* (2013.01)
*H01P 3/16* (2006.01)

(52) U.S. Cl.
CPC ........................................ *H01P 3/16* (2013.01)
USPC .......................................... 398/116; 398/117

(58) Field of Classification Search
USPC ................................................. 398/115–117
See application file for complete search history.

(56) References Cited

U.S. PATENT DOCUMENTS

| | | |
|---|---|---|
| 3,417,400 A | 12/1968 | Black |
| 3,735,293 A | 5/1973 | Breitenbach |
| 3,781,725 A | 12/1973 | Yoshida |
| 3,909,757 A | 9/1975 | Miyamoto |
| 4,129,841 A | 12/1978 | Hildebrand |
| 4,152,648 A | 5/1979 | Delogne |
| 4,339,733 A | 7/1982 | Smith |
| 4,376,941 A | 3/1983 | Zenel |
| 4,541,120 A | 9/1985 | Szabo |
| 4,987,394 A | 1/1991 | Harman |
| 5,015,052 A * | 5/1991 | Ridgway et al. ................... 385/2 |
| 5,076,622 A | 12/1991 | Bridges |
| 5,076,655 A | 12/1991 | Bridges |
| 5,247,270 A | 9/1993 | Harman |
| 5,291,565 A | 3/1994 | Schaffner |
| 5,309,531 A * | 5/1994 | Sheehy .............................. 385/2 |
| 5,414,552 A | 5/1995 | Godil |
| 5,517,199 A | 5/1996 | DiMattei |
| 5,519,408 A * | 5/1996 | Schnetzer ..................... 343/767 |

(Continued)

OTHER PUBLICATIONS

U.S. Appl. No. 12/252,189, filed Oct. 15, 2008, Hsu.

(Continued)

*Primary Examiner* — Nathan Curs
(74) *Attorney, Agent, or Firm* — Ladas & Parry (57) ABSTRACT

A waveguide assembly for a use with, for example, a microwave receiver. The waveguide assembly includes: a waveguide; a tapered structure disposed within the waveguide, the tapered structure tapering in thickness from a first end with a zero height to a second end where the tapered structure has a height which nearly fills, but does not completely fill, the waveguide, to thereby define a modulator receiving space between the tapered structure and an adjacent wall of said waveguide. The second end of the tapered structure is preferably disposed adjacent an open circuited end of the waveguide. An electro-optic modulator is disposed on a dielectric substrate, the dielectric substrate being disposed at least partially within the modulator receiving space and the electro-optic modulator being disposed so that it is located, in use, at an antinode of a standing wave of the waveguide assembly.

17 Claims, 8 Drawing Sheets

Perspective View

(56) References Cited

U.S. PATENT DOCUMENTS

| | | |
|---|---|---|
| 5,703,706 A | 12/1997 | Eckstein |
| 5,936,203 A | 8/1999 | Ryman |
| 5,936,589 A | 8/1999 | Kawahata |
| 5,940,196 A | 8/1999 | Piehler |
| 5,963,567 A | 10/1999 | Veselka |
| 6,246,500 B1 | 6/2001 | Ackerman |
| 6,268,781 B1 * | 7/2001 | Schaffner ................. 333/26 |
| 6,418,248 B1 | 7/2002 | Hayes |
| 6,509,809 B1 * | 1/2003 | Lynch ..................... 333/26 |
| 6,522,793 B1 | 2/2003 | Szilagyi |
| 6,525,692 B2 | 2/2003 | Kim |
| 6,703,596 B1 | 3/2004 | Moran |
| 6,724,523 B2 | 4/2004 | Yap |
| 6,996,345 B1 | 2/2006 | Chen |
| 7,133,576 B2 | 11/2006 | Coldren |
| 7,260,280 B2 | 8/2007 | Ichioka |
| 7,369,722 B2 | 5/2008 | Yilmaz |
| 7,471,258 B2 | 12/2008 | Hsu |
| 7,486,247 B2 | 2/2009 | Ridgway |
| 7,558,488 B2 | 7/2009 | Matsui |
| 7,657,132 B1 | 2/2010 | Yap |
| 7,660,491 B2 | 2/2010 | Thaniyavarn |
| 7,738,794 B2 | 6/2010 | Akiyama |
| 7,835,600 B1 | 11/2010 | Yap |
| 8,059,045 B1 | 11/2011 | Schaffner |
| 8,059,969 B1 | 11/2011 | Yap |
| 8,180,183 B1 | 5/2012 | Yap |
| 8,498,539 B1 * | 7/2013 | Ilchenko et al. .............. 398/115 |
| 2002/0105378 A1 | 8/2002 | Tapio |
| 2003/0048232 A1 * | 3/2003 | Lynch ........................ 343/786 |
| 2003/0214450 A1 * | 11/2003 | Lynch et al. ................. 343/772 |
| 2004/0067006 A1 | 4/2004 | Welch |
| 2004/0179825 A1 | 9/2004 | Im |
| 2006/0270368 A1 | 11/2006 | Caimi |
| 2008/0069491 A1 | 3/2008 | Kissa |
| 2009/0016729 A1 * | 1/2009 | Ridgway et al. .............. 398/115 |
| 2009/0051614 A1 | 2/2009 | Wong |

OTHER PUBLICATIONS

U.S. Appl. No. 12/176,114, filed Jul. 18, 2008, Schaffner.
Adams, R.C., et al., "COMWIN Antenna System Fiscal Year 200 Report," SPAWAR, Technical Report 1836, (Sep. 2000), pp. 637-641.
Ayazi, A.; Hsu, R.C.J; Houshmand, B.; Steier, W.H.; and Jalali, B. entitled "All-dielctric photonic-assisted wireless receiver," Optics Express, vol. 16, No. 3, Feb. 4, 2008, pp. 1742-1747.
Betts, G.E., et al., "High-Sensitivity Bandpass RF Modulator in LiNb03," SPIE Integrated Optical Circuit Engineering VI, vol. 993, pp. 110-116 (1988).
Bridges and Schaffner, IEEE Transactions on Microwave Theory and Techniques, vol. 43, No. 9, pp. 2184-2197 (Sep. 1995).
Bridges, William B., Finbar Sheehy, Finbar T., Schaffner, James H., "Wave-Coupled LiNbO$_3$ Electrooptic Modualtor for Microwave and Milliemter-Wave Moduation," IEEE Photonics Tech. Letters, vol. 3, No. 2, Feb. 1991, pp. 133-135.
Cho, et al., IEEEE Journal of Quantum Electronics, vol. QE-13, No. 4, pp. 206-208 (Apr. 1977).
Cohn, S.B., "Optimum Design of Stepped Transmission Line Transformers," IRE Trans. Microwave Theory Tech., vol. 3, Issue 3, pp. 16-21 (Apr. 1955).
Collins, Robert E. Collin, Foundations for Microwave Engineering, McGraw-Hill, New York, 1966, at pp. 237-254.
Cutolo, et al., Applied Physics Letters, vol. 71, No. 2, pp. 199-201 (Jul. 14, 1997).
Elliot, Robert S., Electromagnetics, IEEE Press. New York, 1993, equation 5.85, p. 285-291.
Emerson and Cumming Microwave Products, Eccostock HiK500F data sheet, www.eccosorb.com, rev. May 11, 2007.
Farwell, et al., IEEE Photonics Technology Letters, vol. 5, No. 7, pp. 779-782 (Jul. 1993).
Ghatak, A.K., et al., "Optical Electronics," pp. 441-448, Cambridge University Press, 1989.
Harrington, Roger F., Time-Harmonic Electromagnetic Fields, McGraw-Hill, New York, 1961, pp. 381-394.
Hsu, R.C., et al., "All-dielctric photonic-assisted radio front-end technology," Nature Photonics, vol., pp. 535-538 (Sep. 2007).
Johnson, et al., IEEE Photonics Techn. Letters, vol. 2, No. 11, pp. 810-811 (Nov. 1990).
Khurgin, et al., Optical Letters, vol. 25, pp. 70-72 (2000).
Kim, et al., "Distributed Bragg Feedback Intensity Modulator in Ti:LiNbO3," Electronics Lett., vol. 41, No. 18, Sep. 1, 2005, pp. 1028-1030.
Kim, S. Geary, K., Chang, D., Fetterman, Zhang, H., Zhang, C., Wang, C., and Steier, W., "TM-pass Electro-optic APC-CPW Polymeric Modulators with Poling-Induced Waveguides and Self-Aligned Electrodes," Optical Fiber Communications Conference 2003, OFC 2003, Mar. 23-28, 2008, pp. 319-320.
Kumar, G., et al., "Broadband Microstrip Antennas," Table 2, p. 43, Artech House (2003).
Lee, R.T., et al., "A design study for the basic TEM horn antenna," IEEE Antennas and Propagation Magazine, vol. 46, No. 1, pp. 86-92 (Feb. 2004).
Liang, Jia Y. and Wilson, Mike G. F., "An Integrated Optical Fabry-Perot Modulator in LiNbO$_3$," Microwave and Optical Tech. Lett. vol. 6, No. 15, Jan. 22, 2007, pp. 867-869.
LINX Technologies RXM-900-HP-II RF Module specification— <www.linxtechnologies.com> Web.December 30, 2008.
MAXIM, Receiver Sensitivity Equation for Spread Spectrum Systems, MAXIM application note 1140, Jun. 28, 2002 www.maxim-ic.com/an1140.
Morito, K., et al., "A Broad-Band MQW Semiconductor Optical Amplifier with High Saturation Output power and Low Noise Figure," IEEE Photon. Technol. Lett. vol. 17, No. 5, pp. 974-976 (May 2005).
NAVSYNC CW20 GPS receiver specification—www.navsync.com, 2007.
Rahman. B.M.A. and Haxha, S., "Optimization of Microwave Properties for Ultra-Speed Etched and Unetched Lithium Niobate Electrooptic Modulators," J. Lightwave Tehnology, vol. 20, No. 10, Oct. 2002, pp. 1856-1863.
Rigden, John S., Macmillan Encyclopedia of Physics, Simon & Schuster, 1996:353.
Ruze. J., "Wide-Angle Metal Plate Optics," Proceedings of the I.R.E., vol. 38, No. 1, pp. 53-59 (Jan. 1950).
Shaw, et al., Electronics Letters, vol. 35, No. 18, pp. 1557-1558 (Sep. 2, 1999).
Shi, W., et al., "Demonstration of Dual-Depletion-Region Electroabsorption modulator at 1.55-μm Wavelength for High Speed and Low Driving Voltage Performance," IEEE Photon. Technol. Lett., vol. 17, No. 10, pp. 2068-2070 (Oct. 2005).
Sun, et al., Electronic Letters, vol. 31, No. 11, pp. 902-903 (May 1995).
Suzuki, T., et al., "Design of a tunnel relay system with a leaky coaxial cable in an 800MHz band land mobile telephone system," Vehicular Technology, IEEE Transactions on, vol. 29, No. 3, pp. 305-316 (Aug. 1980).
Taylor, Journal of Lightwave Technology, vol. 17, No. 10, pp. 1875-1883 (Oct. 1999).
Thomas, R.W., et al., "Radiax.TM., a new radiating coaxial cable," Vehicular Technology Conference, 22nd IEEE, vol. 22, pp. 430-439, (Dec. 7-8, 1971).
Wait, J.R., "Electromagnetic Theory of the Loosely Braided Coaxial Cable: Part 1," IEEE Transactions on Microwave Theory and Techniques, vol. MIT-24, No. 9 (Sep. 1976), pp. 547 to 553.
Walker, Robert G., "High-Speed III-V Semiconductor Intensity Modulators," IEEE J. Quantum Electronics, vol. 27, No. 3, Mar. 1991, pp. 654-667.
Welstand, et al., IEEE Photonics Technology Letters, vol. 7, No. 7, pp. 751-753 (Jul. 1995).
Wood, L. "Opening Statement before the United States Senate Committee on the Judiciary, Subcommittee on Terrorism," Mar. 8, 2005 (pp. 1-5).
From U.S. Appl. No. 12/141,825 (now U.S. Patent No. 7,657,132), Office Action mailed on Apr. 3, 2009.

(56) References Cited

OTHER PUBLICATIONS

From U.S. Appl. No. 12/141,825 (now U.S. Patent No. 7,657,132), Office Action mailed on Sep. 18, 2009.
From U.S. Appl. No. 12/141,834 (now U.S. Patent No. 8,059,969), Office Action mailed on Mar. 31, 2011.
From U.S. Appl. No. 12/141,834 (now U.S. Patent No. 8,059,969), Office Action mailed on Apr. 14, 2011.
From U.S. Appl. No. 12/141,834 (now U.S. Patent No. 8,059,969), Office Action mailed on Jul. 11, 2011.
From U.S. Appl. No. 12/176,071 (now U.S. Patent No. 7,835,600), Office Action mailed on Apr. 7, 2010.
From U.S. Appl. No. 12/176,071 (now U.S. Patent No. 7,835,600), Office Action mailed on Jul. 15, 2010.
From U.S. Appl. No. 12/176,089 (now U.S. Patent No. 8,180,183), Office Acton mailed on Nov. 9, 2009.
From U.S. Appl. No. 12/176,089 (now U.S. Patent No. 8,180,183), Office Acton mailed on May 12, 2010.
From U.S. Appl. No. 12/176,089 (now U.S. Patent No. 8,180,183), Office Acton mailed on Jul. 26, 2010.
From U.S. Appl. No. 12/176,089 (now U.S. Patent No. 8,180,183), Office Acton mailed on Oct. 5, 2010.
From U.S. Appl. No. 12/176,089 (now U.S. Patent No. 8,180,183), Office Acton mailed on Jul. 20, 2011.
From U.S. Appl. No. 12/176,089 (now U.S. Patent No. 8,180,183), Office Acton mailed on Jan. 20, 2012.
From U.S. Appl. No. 12/176,114 (unpublished; non publication requested) filed on Jul. 18, 2008, Office Action mailed on May 3, 2011.
From U.S. Appl. No. 12/176,114 (unpublished; non publication requested) filed on Jul. 18, 2008, Office Action mailed on May 3, 2013.
From U.S. Appl. No. 12/176,114 (unpublished; non publication requested) filed on Jul. 18, 2008, Office Action mailed on Sep. 18, 2013.
From U.S. Appl. No. 12/176,114 (unpublished; non publication requested) filed on Jul. 18, 2008, Office Action mailed on Oct. 18, 2011.
From U.S. Appl. No. 12/176,114 (unpublished; non publication requested) filed on Jul. 18, 2008, Office Action mailed on Dec. 5, 2013.

* cited by examiner

Fig. 1a Side View  Fig. 1b Perspective View  Fig. 1c Bottom View

Modulator Substrate: 0.25 mm thick

Frequency 9.3 GHz

Fig. 12a

Modulator Substrate: 0.5 mm thick

WAVEGUIDE ASSEMBLY FOR A MICROWAVE RECEIVER WITH ELECTRO-OPTIC MODULATOR

CROSS REFERENCE TO RELATED APPLICATIONS

This application is a continuation in part of U.S. Ser. No. 12/176,114 filed on Jul. 18, 2008 and entitled "An RF Receiver Front-End Assembly", and is also related to the following US patent applications: U.S. Ser. No. 12/141,825, filed on Jun. 18, 2008 and entitled "Optoelectronic modulator and electric-field sensor with multiple optical-waveguide gratings"; U.S. Ser. No. 12/141,834, filed on Jun. 18, 2008 and entitled "Enhanced Linearity RF Photonic Link"; U.S. Ser. No. 12/176,089, filed on Jul. 18, 2008 and entitled "Parallel Modulator Photonic Link"; and U.S. Ser. No. 12/176,071, filed on Jul. 18, 2008 and entitled "Microwave receiver front-end assembly and array". The disclosure of each of these related applications is hereby incorporated herein by reference.

STATEMENT REGARDING FEDERAL FUNDING

This invention was made under U.S. Government contract W911QX-08-C-0074. The U.S. Government has certain rights in this invention.

TECHNICAL FIELD

Disclosed is a wideband electromagnetic (EM) field sensor assembly for a microwave receiver front end. The EM field sensor is sensitive to small microwave signal powers, and makes the front end also resistant to being damaged by unwanted high-power incident EM radiation.

BACKGROUND

A robust and broadband waveguide assembly for a microwave receiver front end is disclosed that should not be damaged by exposure to intentional or unintentional high power microwave energy. This assembly uses an electro-optic modulator inside the assembly that senses the microwave or RF electric field at that electro-optic modulator and produces a modulated optical signal. The assembly maximizes the transduction of the RF signal to an RF modulated optical signal by concentrating the electromagnetic field using a tapered ridged waveguide transition, terminating the ridged waveguide abruptly at the end of the fixture in an ostensibly open circuit, and placing the modulator at an electric field antinode of the resulting standing wave in the assembly.

The prior art includes:

1. An article by R. C. J. Hsu, A. Ayazi, B. Houshmand, and B. Jalali, entitled "All-dielectric photonic-assisted radio front-end technology", *Nature Photonics*, vol. 1, September 2007, pp. 535-538. The disclosed apparatus uses an electro-optic modulator to sense the level of the microwave signal coupled into a dielectric resonator antenna. The electro-optic modulator is part of an RF-photonic link that provides electrical isolation between the antenna and the rest of the microwave receiver front-end (which contains the sensitive radio components), thereby achieving tolerance to unwanted high power electromagnetic radiation. This prior approach is based on an electro-optic microdisk resonator (acting as the modulator) that is intimately in contact with the dielectric resonator antenna. Because of its resonant antenna, this prior art apparatus couples in substantial power from incident radiation at only those frequencies that match the resonant frequencies of the antenna. Nevertheless, despite its all dielectric construction, the power at those resonant frequencies is slowly absorbed by the dielectric antenna of this prior art apparatus over a characteristic time that is inversely proportional to the resonator linewidth. If that absorbed power is sufficiently high, it can damage or alter the antenna and the modulator.

2. An Article by A. Ayazi, R. C. J. Hsu, B. Houshmand, W. H. Steier, and B. Jalali, entitled "All-dielectric photonic-assisted wireless receiver," *Optics Express*, vol. 16, No. 3, Feb. 4, 2008, pp. 1742-1747. This article reports a LiNbO3 electro-optic modulator, in the shape of a disk optical resonator, which is coupled to a dielectric resonator antenna. Input and output optical fibers are coupled to the resonator modulator through the use of an optical prism. The nature of the optical disk resonator and the dielectric resonator antenna apparently limits this approach to bandwidths less than 10%.

3. Asif A. Godil, "Partially Loaded Microwave Waveguide Resonant Standing Wave Electro-Optic Modulator, U.S. Pat. No. 5,414,552, issued May 9, 1995.

In U.S. patent application Ser. No. 12/176,071, filed on Jul. 18, 2008 and entitled "Microwave receiver front-end assembly and array", an RF front-end assembly is described in which a TEM horn antenna is transitioned into a TEM waveguide where an electro-optic modulator or an array of electro-optic modulators is placed. The TEM waveguide preferably is filled with a dielectric material whose dielectric constant is the same as the dielectric constant of the electro-optic modulator material. In contrast, this disclosure provides an alternative approach to this prior approach in that the presently disclosed invention shares an objective of concentrating the electromagnetic field to increase the electro-optic conversion efficiency of the electro-optic modulator without forming printed circuit electrodes directly on the modulator substrate. Also, it shares the objective of producing an electric field of uniform amplitude across the modulator. One advantage of this present disclosure is that the input of the disclosed assembly is a standard rectangular waveguide, which facilitates its connection to standard waveguide circuits and antennas. In addition, because the disclosed assembly uses a tapered ridged waveguide to concentrate the field delivered to the electro-optic modulator, the structure is contained within a solid rectangular waveguide frame, thus making it robust and easier to handle to the approach disclosed in U.S. Ser. No. 12/176,071.

BRIEF DESCRIPTION OF THE INVENTION

The novel features of the disclosed apparatus are believed to include:

A microwave-optical assembly that comprises a microwave waveguide enclosing (i) a tapered waveguide, (ii) an all dielectric electro-optic modulator, and (iii) a dielectric filler, wherein the dielectric constant of the dielectric filler is different from and smaller than the dielectric constant of the electro-optic modulator. The all dielectric electro-optic modulator of the types disclosed in the applications incorporated by reference above may be utilized in this invention. See, in particular, FIGS. 8c, 9 and 10b of U.S. Ser. No. 12/176,071.

A metallic taper is preferably disposed in the waveguide so that the waveguiding space within the waveguide effectively decreases in height starting at some point proximate the input end of the assembly and is preferably terminated abruptly at the opposite end of the assembly, to form, for all intents and purposes, an open circuit terminated end (there can be a small residual radiation resistance and a small residual capacitance at the opposite end of the waveguide but they should not be so significant that the waveguide would not be treated by those skilled in the art as if it were an open circuit at the terminated end of the assembly (near where the electro-optic modulator is located). So the electro-optic modulator is located near the terminated end of the ridge waveguide. If the waveguiding space is closed circuited, then the electro-optic modulator should preferably be disposed away from the point of closure to inhance the strength of the electric field at the electro-optic modulator.

The metallic tapper preferably has a tapered height and preferably provides an impedance-matching transition between a input end of the waveguide end and a distal end where the electro-optic modulator is preferably located, thereby efficiently concentrating an incoming electric field at the electro-optic modulator. The electro-optic modulator is preferably located at an electric field standing wave antinode at or near the distal end of the waveguide.

A dielectric filler may at least partially fill the otherwise open space within the waveguide, the dielectric filler, if used, preferably having high dielectric strength to prevent electric field breakdown in the waveguide assembly.

A piece of dielectric material, such as diamond that has high thermal conductivity, is preferably utilized so that this dielectric material is in thermal contact with the electro-optic modulator substrate as well as with metal portions of the assembly, thereby acting as a heat spreader and providing a thermally conductive path for cooling the modulator in modulator substrate.

In one aspect the present invention provides a waveguide assembly for a use with, for example, a microwave receiver, the waveguide assembly comprising: a waveguide having an input end and a distal end; a tapered electrically conductive structure disposed within said waveguide, the tapered metallic structure tapering in thickness from a first end of the tapered metallic structure where the tapered electrically conductive structure has a minimal impact on an interior height of said waveguide to a second end of the tapered electrically conductive structure where the tapered electrically conductive structure has a height which nearly fills, but does not completely fill, said waveguide, to thereby define a modulator receiving space between said tapered electrically conductive structure and an adjacent wall of said waveguide, the second end of the tapered electrically conductive structure being disposed immediately adjacent said distal end of said waveguide; and an electro-optic modulator disposed on dielectric material, the dielectric material being at least partially disposed within said modulator receiving space.

In another aspect the present invention provides a waveguide assembly comprising: a waveguide having an input end and a distal end, the waveguide having a waveguiding space which decreases in height from the input end to the distal end, the waveguiding space at the distal end of the waveguide having dimensions defining a receiving space for receiving an electro-optic modulator disposed entirely within said receiving space.

BRIEF DESCRIPTION OF THE DRAWINGS

FIG. 3a is a perspective, exploded view with solid surfaces of an embodiment of the invention which has been designed for operation in the X-band, while

DETAILED DESCRIPTION

Figures 1A, 1B:
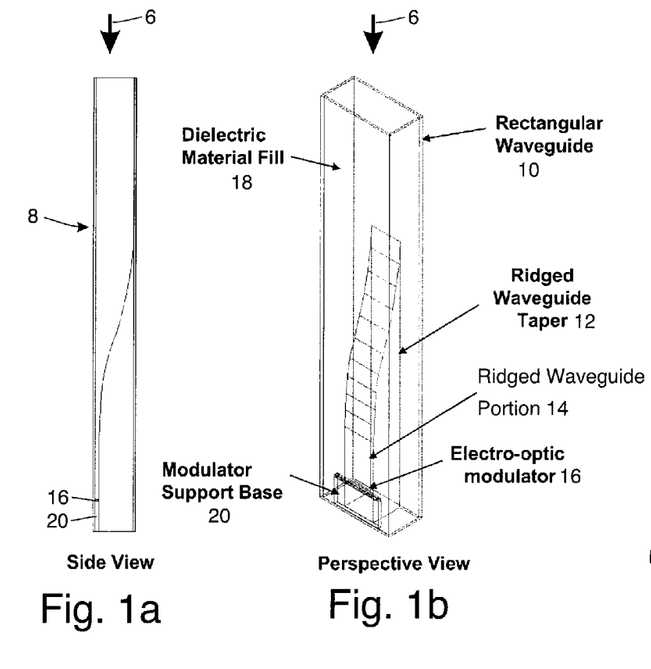
FIGS. 1a-1c depict a side view, a perspective view and a bottom view, respectively, of a basic embodiment of an RF front-end assembly with an electro-optic modulator and transition from a dielectric filled rectangular waveguide to a dielectric filled ridged waveguide.
Figure 1C:
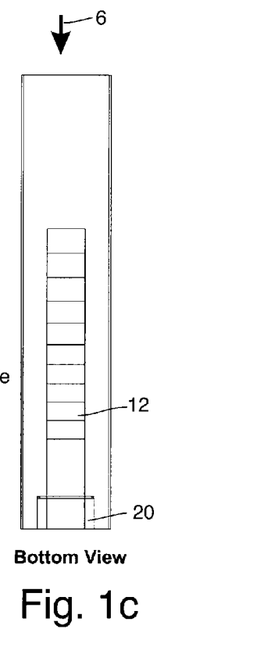

A basic embodiment of a rectangular waveguide to ridged waveguide assembly is shown in FIGS. 1a-1c. In this embodiment an incident RF signal 6 arrives at a modulator 16 via the rectangular waveguide 10. The waveguide dimensions are selected such that only the $TE_{10}$ mode propagates. Preferably, the dimensions of the rectangular waveguide 10 are compatible with standard dimension waveguides, such as those designated by the EIA (Electronic Industry Alliance). The $TE_{10}$ mode is transformed to a single ridged waveguide mode through a ridged waveguide taper 12. The shape of the ridged waveguide taper 12 along the waveguide 10 is determined by the required impedance transformation between the rectangular waveguide 10 and the ridged waveguide 14. Although the impedance of a rectangular waveguide 10 is arbitrary, there is a convention that fixes the impedance based upon the power that flows across the waveguide cross section, and the positive current that flows across the cross-section Z=P/II*.

See Roger F. Harrington, Time-Harmonic Electromagnetic Fields, McGraw-Hill, New York, 1961, pp. 381-394. There are a number of functional forms for the impedance transformation, some examples can be found in Robert E. Collin's book, Foundations for Microwave Engineering, McGraw-Hill, New York, 1966, at pp. 237-254.

In FIGS. 1a-1c, the ridged waveguide transition transforms the electric field incident in the $TE_{10}$ mode of the rectangular waveguide 10 to a modified $TE_{10}$ mode of the ridged portion or waveguiding portion 14 of waveguide 10 where the bottom of the ridged waveguide taper 12 (where the taper 12 has its maximum depth) is nominally spaced a distance from a wall of the ridged portion 14 of waveguide 10 equal to the width of a modulator 16. The modulator 16 is preferably attached to a base or substrate 20 made of a dielectric material and is inserted into the assembly shown in FIGS. 1a-1c adjacent the ridge of the ridged waveguide taper 12 in the waveguide. The orientation of the modulator 16 is preferably such that the edge of the ridged waveguide taper 12 and the adjacent wall of the ridged portion 14 of the waveguide 10 serve as RF electrodes for the modulator 16.

The ridged waveguide taper 12 has a width in this embodiment which is preferably less that the interior width of the rectangular waveguide 10. The ridge should preferably be at least as wide as the width of the electro-optic modulator 16 to provide a uniform electric field across the modulator (see FIG. 2).

Figure 2:
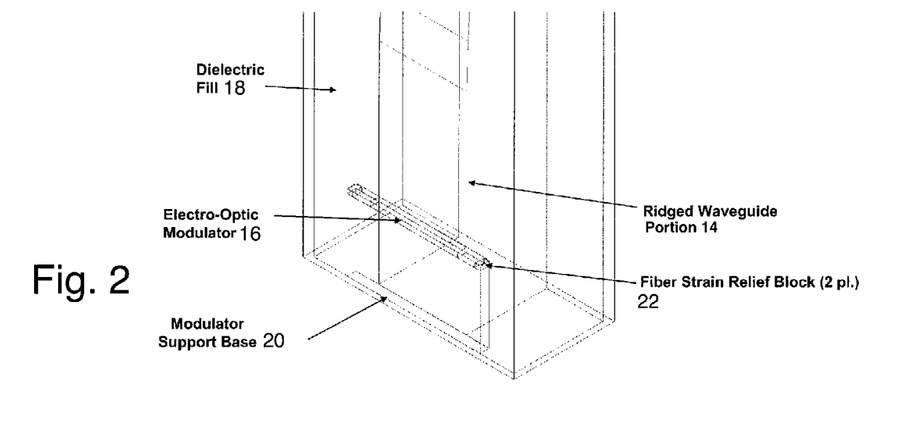
FIG. 2 is close-up view of the bottom portion of FIG. 1b at the end of the RF front-end assembly where the modulator is located.
Figure 2A:
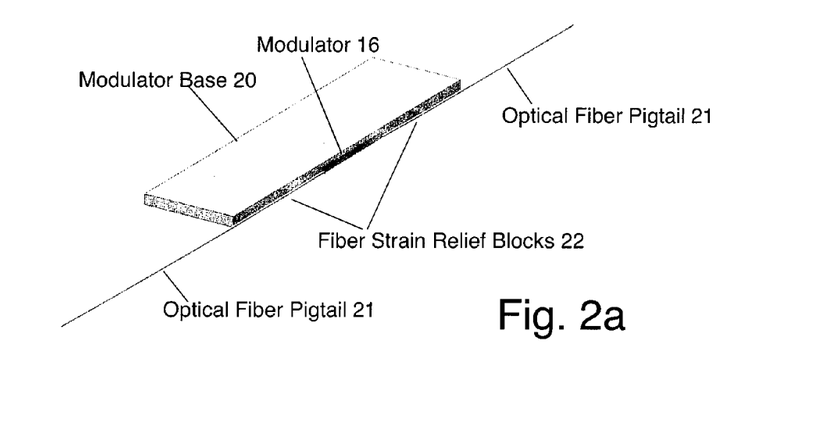
FIGS. 2a and 2b are enlarged perspective and elevational views, respectively, of the modulator, its base and associated pigtails.
Figure 2B:
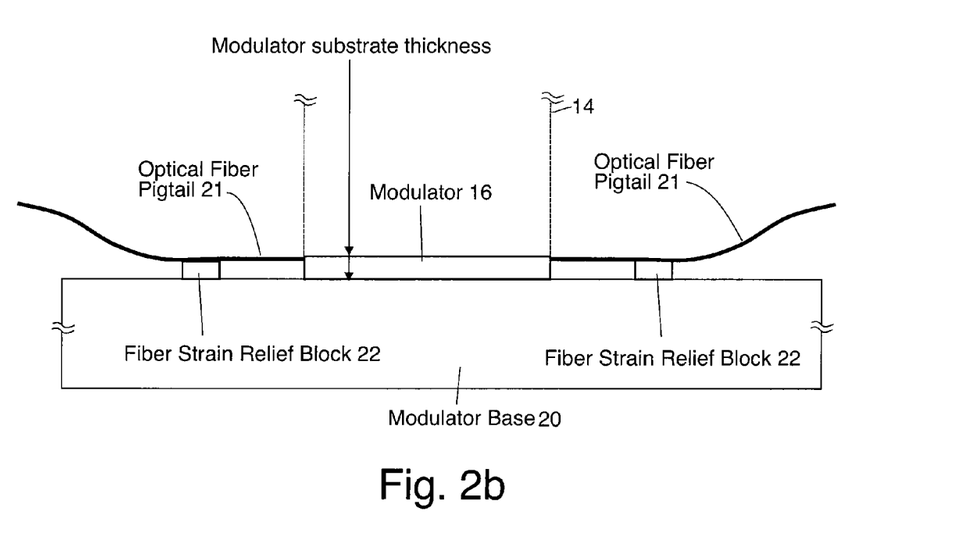

A close-up view of the front-end assembly where the modulator 16 is located is shown in greater detail in FIG. 2 and close up views of the modulator 16, its base 20 and its optical pigtails 21 are shown in FIGS. 2a and 2b. Fiber strain relief blocks 22 are preferably used to provide mechanical support for input and output fibers 21 to the modulator 16. If utilized, they are preferably made of the same material as the modulator base or substrate 20 to match the thermal expansion coefficient(s) of the modulator 16. The ridged waveguide 14 is preferably terminated in an open circuit to free space. The rectangular and ridged portions of the waveguide assembly may be filled with a high strength dielectric 18 to prevent air breakdown, which nominally occurs at field strength of 30 kV/cm. See John S. Rigden, *Macmillan Encyclopedia of Physics*, Simon & Schuster, 1996:353. The ridged waveguide 14 preferably has a width equal to that of the modulator 16 as shown in FIG. 2b. The ridge waveguide 14 is designed such that the gap between the ridge formed by the ridged waveguide taper 12 the and the bottom wall of the waveguide is equal to the width of the modulator 16. The modulator's width can be as little as 100 microns to 1 millimeter. Smaller widths are better for uniform electric field and also heat dissipation. The ultimate limit is the robustness of small width modulators during the assembly process of making this rectangular waveguide to ridged waveguide assembly.

Figure 3A:
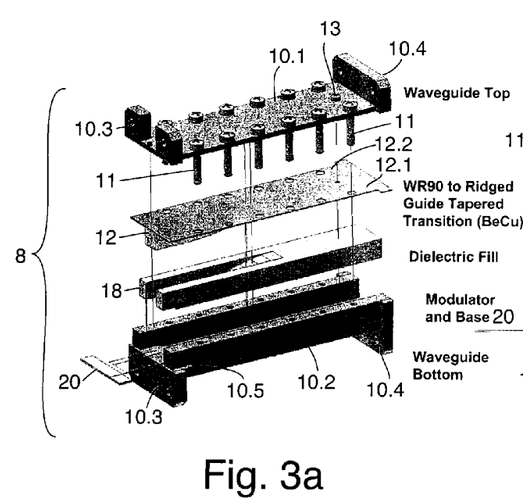
Figure 3B:
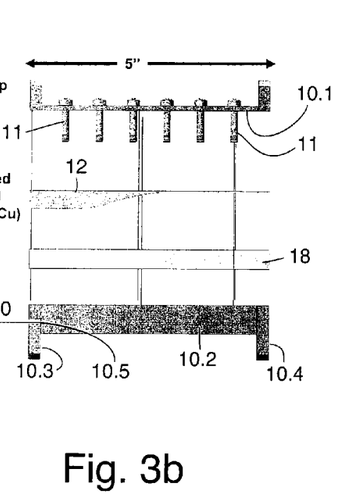
FIG. 3b is an exploded side view thereof.
Figure 4A:
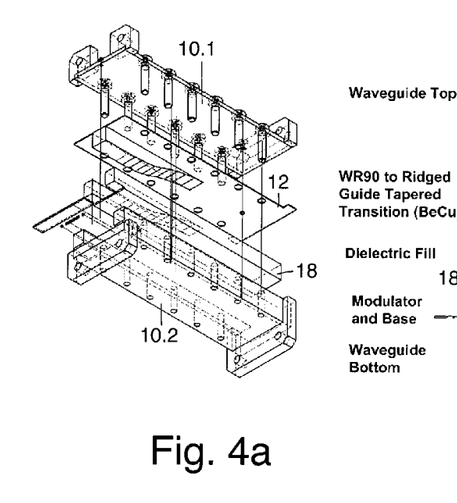
FIG. 4a is a perspective, exploded view with outlines of the embodiment of FIGS. 3a and 3b the invention which has been designed for operation in the X-band
Figure 4B:
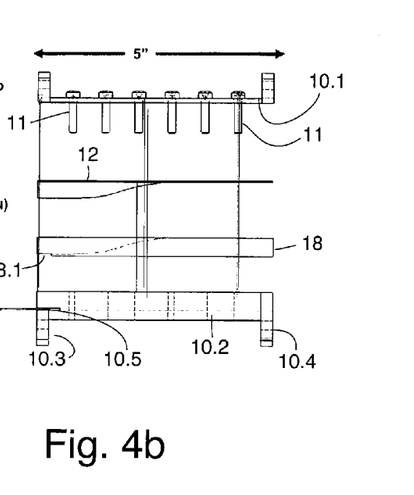
FIG. 4b is an exploded side view thereof.

An X-band embodiment of the invention is shown in solid drawing form in FIGS. 3a and 3b and as a line drawing in FIGS. 4a and 4b. These figures show exploded views of the parts that make up the assembly. Each of the depicted parts is easily machined (although other manufacturing techniques may be used if desired). The rectangular waveguide 10 is preferably fabricated from two blocks or pieces of metal 10.1 and 10.2 (preferably aluminum, but other metals having good conductivity to reduce Joule heating by flowing current, such as brass and copper, can alternatively be used) which are preferably screwed together by screws 11 to form the complete rectangular waveguide 10. Standard dimension waveguide flanges 10.3 and 10.4, machined into the two waveguide parts 10.1 and 10.2 are preferably utilized and are depicted. The ridged waveguide portion 14 is defined (on one of its sides) by the taper 12 which is preferably machined from a separate piece of metal (preferably BeCu, but brass also seems to work quite nicely) so the ridged waveguide taper 12 is preferably made from a solid piece of metal—it preferably has no voids in it. A set screw 13 may be utilized to allow the height of the ridged waveguide 14 above the bottom wall of the waveguide 10 to be adjusted. The ridged waveguide taper 12 preferably has associated lateral flanges 12.1 and 12.2 with openings therein for screws 11. Flanges 12.1 and 12.2 can be provided by a separate piece of metal, in which case the taper 12 can be attached to a metal sheet forming flanges 12.1 and 12.2 by metal screws which are not shown.

In the waveguide assembly 8 the ridged waveguide taper 12 is preferably sandwiched between the two rectangular waveguide pieces 10.1 and 10.2. The flanges 12.1 and 12.2, which extend from each side of taper 12, facilitate supporting it within the waveguide, and small projecting tabs from the flanges 12.1 and 12.2 provide additional support within flange 10.4.

Figure 8:
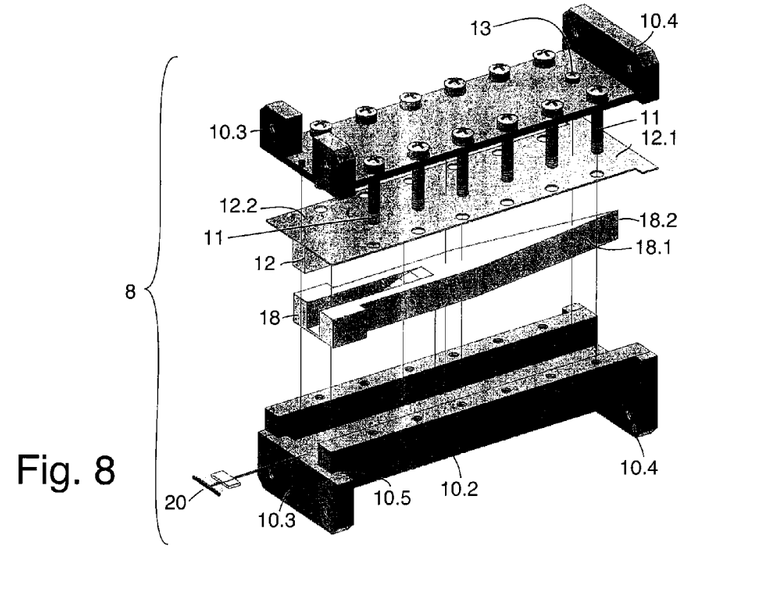
FIG. 8 is an exploded view of alternative embodiment of the high power microwave front-end assembly for partial dielectric waveguide fill with high dielectric constant material.

The dielectric fill 18 is machined or otherwise formed to accommodate the shape of the ridged waveguide taper 12. The machining of the ridged waveguide taper 12 (assuming that the taper is machined as opposed to fabricated in some other manner, such as casting) can be done using computer aided machining techniques. In this embodiment, the ridged waveguide taper has a smooth taper which is preferably approximated by ten linear segments. Also, slots 10.5 are preferably cut into the sides of the ridged waveguide to accommodate an optical fiber to bring an optical carrier into the modulator 16 and a modulated carrier out of the modulator 16 via pigtails 21 (see FIGS. 2a and 2b). The dielectric filler 18 may have a width that is wider than the width of the preferably metallic, ridged waveguide taper 12 and narrower than the width of the interior of the rectangular waveguide 10. The constraints on how wide the filler 18 can be are a function of the dielectric constant of the material used as the filler 18 and the width of the waveguide 10. Adding dielectric material into a waveguide can lead to the undesirable propagation of higher order modes. So, in these disclosed embodiments, which preferably use a standard waveguide dimension, the filler material 18 preferably does not reach the interior sidewalls of the waveguide 10. However, it is possible to adjust the waveguide dimensions so that the dielectric 18 fills the waveguide completely, if desired. The width of the dielectric filler material 18 in the embodiment of FIG. 3 is preferably 0.9" (2.286 cm) while the width of the filler material 18 in the embodiment of FIG. 8 is preferably 0.6" (1.524 cm).

This embodiment of FIGS. 3a, 3b, 4a, 4b and 5 is designed for operation at X-band frequencies (8.4-12.4 GHz), although this approach can be applied to other frequencies by changing the dimensions of the components with frequency through scaling laws known to those skilled in the art. The rectangular waveguide dimensions in this embodiment preferably conform to the standard waveguide size of WR-90 which has an inner dimension of 1.016 cm×2.286 cm. The dielectric fill material 18 preferably has a fairly low dielectric constant to prevent multi-mode operation of the ridged waveguide assembly. Such dielectric fill 18 material may be C-Stock RH, made by Cuming Microwave, which is low-loss structural foam that is machinable. It has a dielectric constant range of 1.09-1.14. Another possible material for the dielectric fill 18 is Eccostock® FFP, which is a powder that cures into foam. It has a dielectric constant of 1.25. In this embodiment, the ridged waveguide taper 12 is one cm wide (0.394 in), and the ridged waveguide taper 12 is designed to place the bottom of the ridge one mm from the bottom wall of the waveguide 10.

Figure 5:
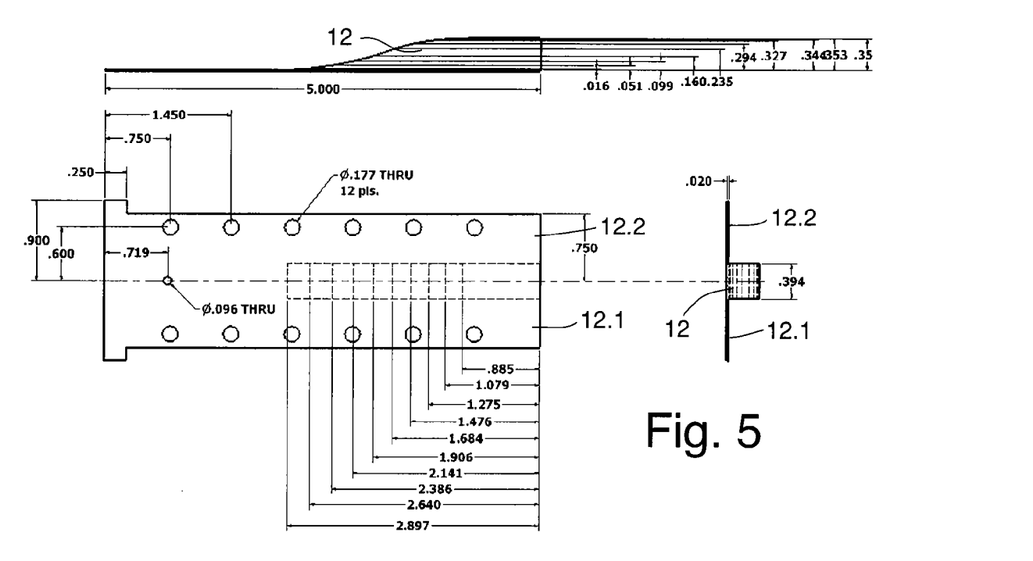
FIG. 5 depicts the taper for the RF front-end assembly generally shown in FIGS. 1a-1c with dimensions, in inches, for the embodiment of FIGS. 3a, 3b, 4a and 4b.

A drawing with dimensions (in inches) of the assembly piece with the ridged waveguide taper 12 and its flanges 12.1 and 12.2 for this embodiment is shown in FIG. 5.

The length of the waveguide structure is shown as five inches in FIG. 5, and the tapered transition only begins about halfway along that length for this embodiment. The five inch dimension was selected to make a prototype unit before the length of the tapered transition was known. Since the receiving end at flange 10.4 is preferably connected to another waveguide, the length of the assembly can be shortened, if desired, so that the taper of the ridged waveguide taper 14 begins immediately at or nearer the input end at flange 10.4.

The modulator support base 20 extends from the open end of the ridged waveguide to a distance that places the modulator 16 at a standing wave antinode of the RF signal. This is where the electric field across the modulator 16 will be maximized. The base 20 is preferably made of C-stock Low-K 39 dielectric material, made by Cuming Microwave, which has a dielectric constant of 1.9. Other dielectric materials, such as diamond for thermal dissipation, could be used as a support base as well. Electromagnetic simulations using Ansoft HFSS® were used to determine that a length of C-stock Low-K 39 that was 0.813 cm would place the modulator at an antinode of the standing wave of a 9.3 GHz signal A line drawing of the detail of the modulator 16 and base support 20 insertion into the ridged waveguide end is shown in exploded view by FIG. 6.

Figure 6:
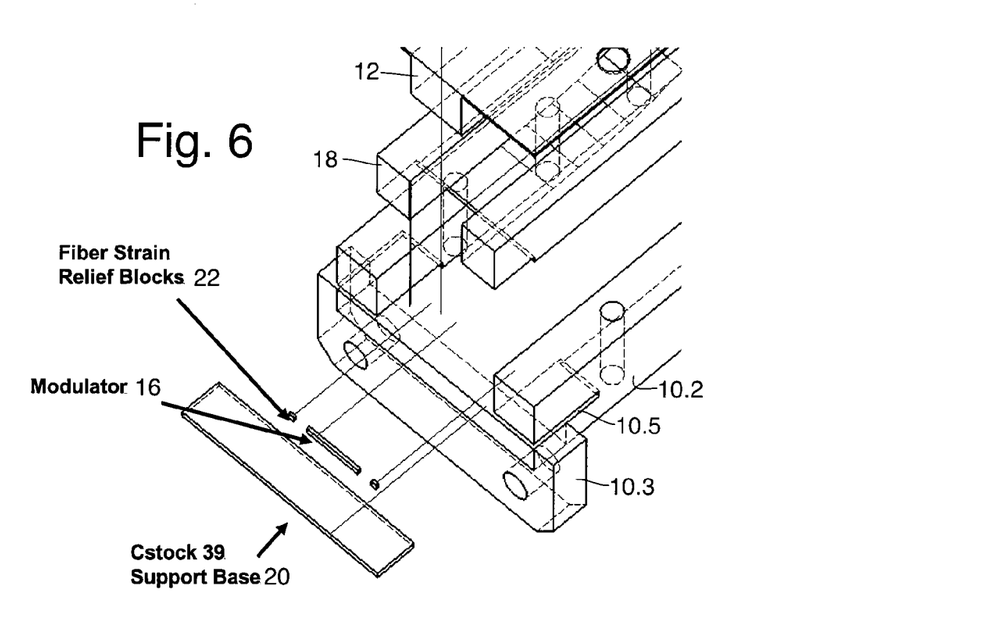
FIG. 6 is a line drawing detail of the modulator and support base insertion into the ridged waveguide end of the RF Front-End assembly.

A function of the modulator support base 20, such as the C-stock K39 base shown in FIG. 6, is to act as a spacer that places the modulator 16 at an antinode of the standing wave of the preferably open-circuited waveguide structure. Another function of base 20, illustrated in FIGS. 2b and 6, is to serve preferably as a submount for mounting the substrate of modulator 16, the optical fiber pigtails 21 made to the modulator and any support or strain-relief blocks 22 used for the pigtailing. Instead of using a separate base 20 as the modulator submount, a portion of the dielectric filler 18 could be used instead as the submount. In that case, the substrate of modulator 16 and the strain-relief blocks 22 would be mounted on the back side of the dielectric filler 18. Otherwise, the dielectric filler is preferably notched at 18.1 (see FIG. 4b) to accommodate the modulator base 20 and modulator 16.

If needed, the base 20 could be made from a dielectric material, such as diamond, that has high thermal conductivity. In this case, the modulator 16 would be mounted onto a thermally conductive base 20. That thermally conductive base 20 can serve as a thermal path to conduct heat generated in the modulator 16 away to the metal portions of the assembly 8. Diamond, however, has a fairly high dielectric constant, approximately 5.7-5.8. Thus, compared to a material with low dielectric constant, a diamond base piece with shorter length is needed to place the modulator at the desired antinode of the standing wave of the structure. Also, the width of the diamond base piece preferably is only as wide as that of the substrate of modulator 16, in order to not degrade the uniformity of the E-field at the modulator 16.

When making a prototype unit, the taper 12 was made from brass and the waveguide 10 from aluminum. This was to be able to distort the brass a bit with a set-screw, if needed, to ensure the taper 12 actually touched the modulator 16. The taper and waveguide can be made from the same material, for example, aluminum, and without the set-screw, if desired.

The waveguide 10, although shown in solid metal, can instead be formed of a dielectric material covered with a metallic or other electrically conductive coating. Similarly, the taper 12, although shown in solid metal, can instead be formed of a dielectric material covered with a metallic or other electrically conductive coating. Solid metal is preferred for both the waveguide 10 and the taper material due to its superior thermal conduction capabilities. The waveguide is shown in the figures as having a rectangular configuration for ease of construction. And while rectangular waveguides are commonly used in industry for various reasons, waveguide 10 need not have a rectangular configuration, as other waveguide configurations, such as a waveguide circular in cross section or a transverse electro-magnetic (TEM) waveguide, could alternatively be employed, if desired.

An Alternative Embodiment

Figure 7:
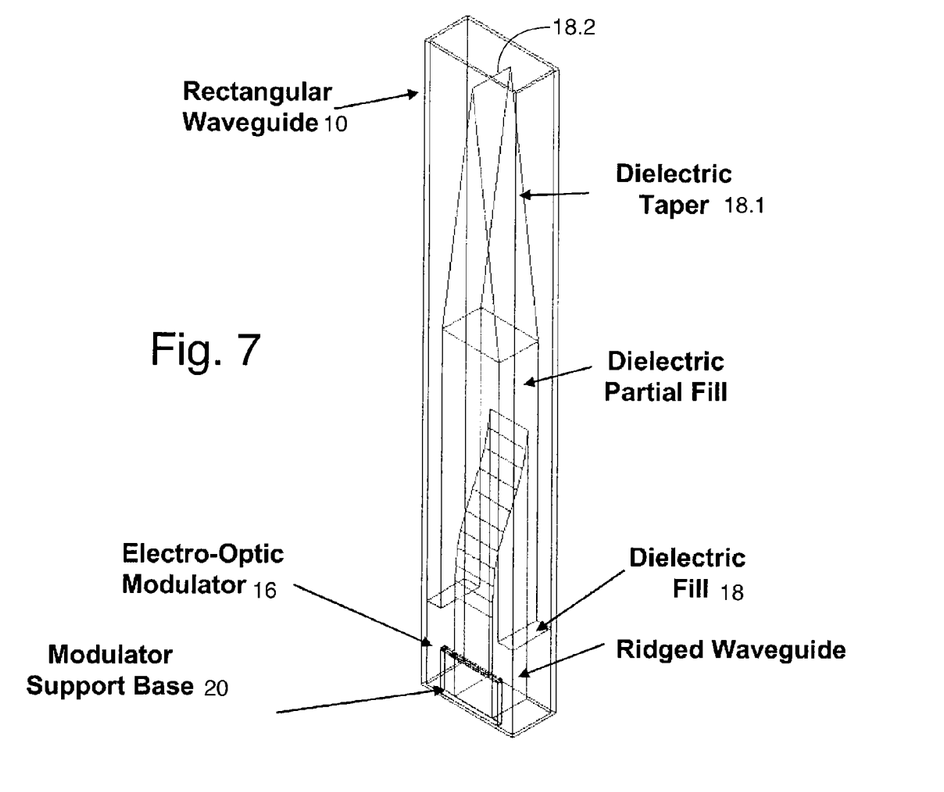
FIG. 7 depicts an embodiment of the RF high power microwave front-end assembly for higher dielectric constant, partial fills ($\in$r: 1.8-2.5).

An alternative embodiment of the RF high power microwave assembly is shown in FIG. 7. In this embodiment, the material of the waveguide dielectric filler 18 has a higher dielectric constant than the filler material in the previous embodiment. Examples of such filler material are, for example, Emerson and Cuming Eccostock® HT0003, with $\in_r=2.2$, or Cuming Microwave C-stock Low-K 39, with $\in_r=1.9$. These materials may have a higher dielectric strength that is more resistant to electrical breakdown than a lower dielectric constant material. However, if this embodiment uses a standard rectangular waveguide having the same dimensions as used in the previous embodiment, the $TE_{20}$ mode can propagate, because of the higher dielectric constant of the filler 18. Thus it is desirable to trim the dielectric filler 18 so that it does not fill the waveguide cross section completely in this embodiment.

The dielectric filler 18 near the entrance of the structure 8 preferably has an impedance matching, tapered shape 18.1 with a rather sharp leading edge 18.2, allowing it to form a transition from standard air-filled waveguide at the entrance to structure 8 to a partially dielectric filled waveguide. The leading edge 18.2 is preferably disposed orthogonally to a major axis of the waveguide 10 and is preferably centered within the waveguide 10.

If desired, the dielectric filler 18 at the opposite end of the structure 8, near the modulator, can be enlarged (widened) to completely fill the ridged waveguide since most of the electric field will be under the ridge at that end of the structure 8. This would allow a pressurized insulating gas like sulfur hexaflouride ($SF_6$) to be injected into and fill the void between the outer edges of the dielectric filler 18 and the inner walls of the waveguide 10. The modulator detail is nearly the same as shown in FIG. 6; the modulator base dimension would be adjusted so that the modulator position is coincident with a standing wave antinode in this embodiment.

Figure 9A:
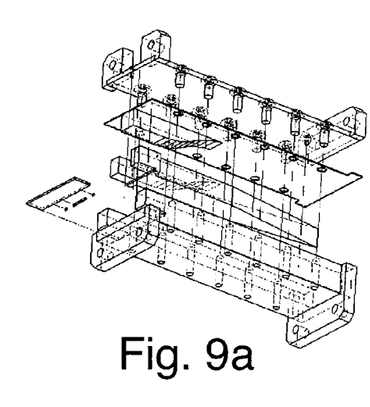
FIGS. 9a and 9b are, respectively, perspective and side elevational line drawings, with the exploded views, of the alternative embodiment of the RF high power microwave front-end assembly for partial dielectric waveguide fill with high dielectric constant material.
Figure 9B:
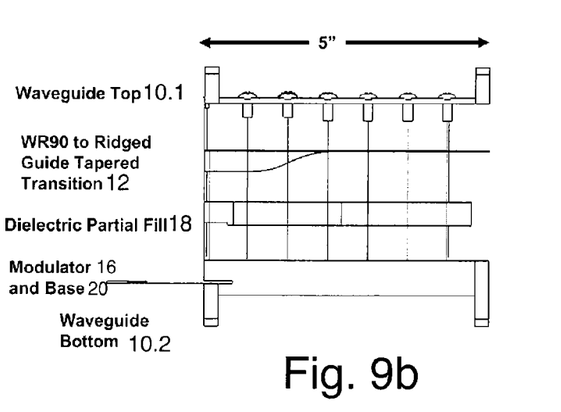

An exploded view of an RF front-end assembly 8 designed for operation at X-band, using Eccostock® HT0003 as the partial dielectric fill is shown in FIG. 8, and the line drawing of the exploded view is shown in FIGS. 9a and 9b. The ridged waveguide 14 is again preferably disposed 1 mm above the waveguide floor. Simulations, using HFSS indicate that the ridged waveguide taper could concentrate the electric field by a factor of 2.1 for a traveling wave, or by a factor of 2.9 for the ridged waveguide left open circuited, as shown in FIG. 7. If the end of the ridged waveguide is desired to be closed circuited, then the modulator 16 should be positioned away from the point of closure so that the electric field is at maximum strength.

Figure 10:
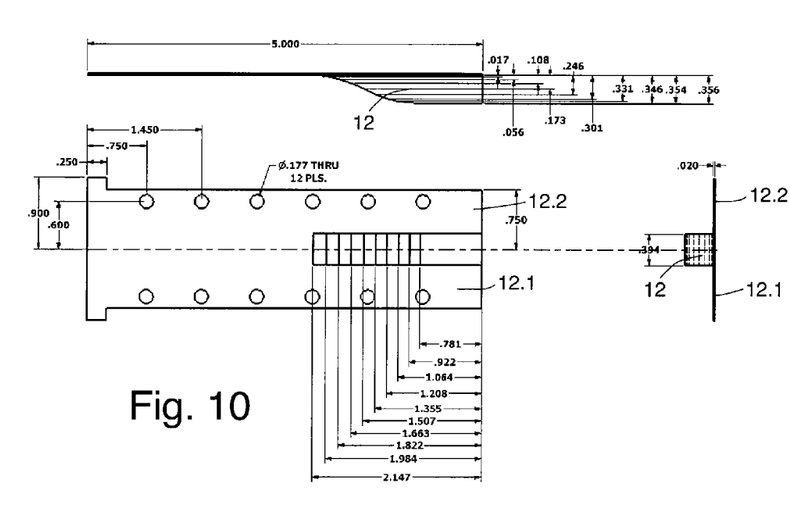
FIG. 10 depicts the taper for the RF front-end assembly of FIG. 7 and the embodiment of FIGS. 8, 9a and 9b. The dimensions given in this figure are in inches.

The preferred dimensions of the ridged waveguide taper 12 for this embodiment are shown in FIG. 10. The dielectric partial fill 18 extends from the waveguide top to bottom, but it is only 1.524 cm (0.6") across the waveguide. The dielectric does fill the ridged waveguide completely for 1.90 cm (0.75") from the open circuited end. The taper in the dielectric is linear and extends in this embodiment 5.84 cm (2.3") in the waveguide 10. Other taper designs known in the art could be used as well. HFSS simulations of this structure lead to the C-stock K39 base being 0.935 cm (0.38") long in order to place the modulator 16 at an antinode of the standing wave of the structure in this embodiment. The preferred dimensions are exemplary and may be adjusted as needed by those skilled in the art.

Additional Considerations

Figure 11A:
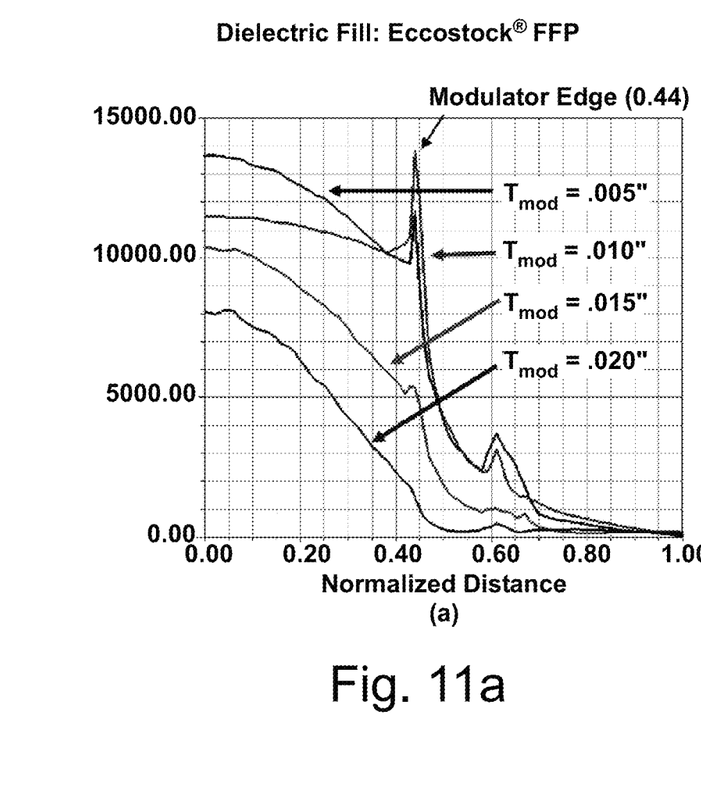
FIGS. 11a and 11b are graphs of field uniformity along the modulator from the center of the ridged waveguide to the edge of the ridged waveguide for, respectively, the RF front-end filled with Eccostock® FFP and the RF front-end filled with Eccostock® HT0003. The distance from the center of the X-band WR90 waveguide to the edge is normalized by 1.143 cm (0.45") half the width of the waveguide. Half of the modulator extends from the center of the waveguide for 0.5 cm.
Figure 11B:
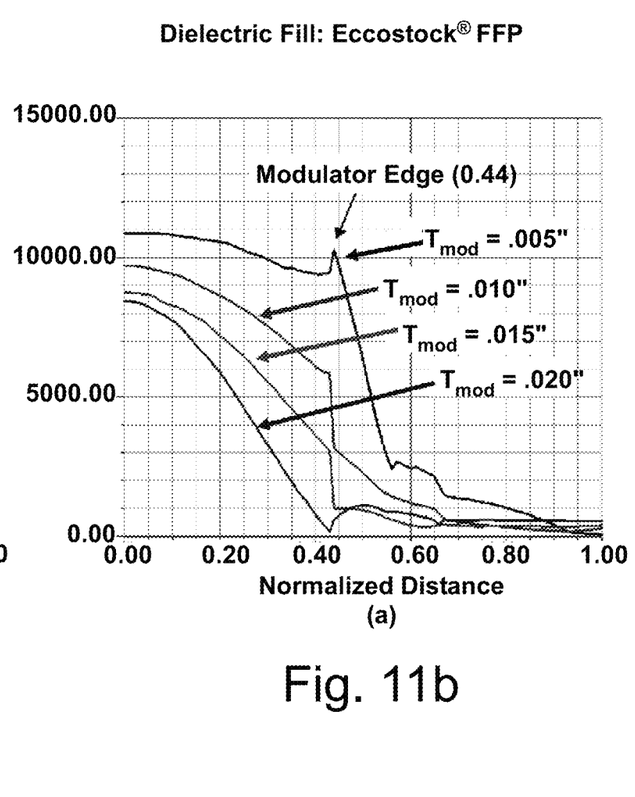
Figure 12A:
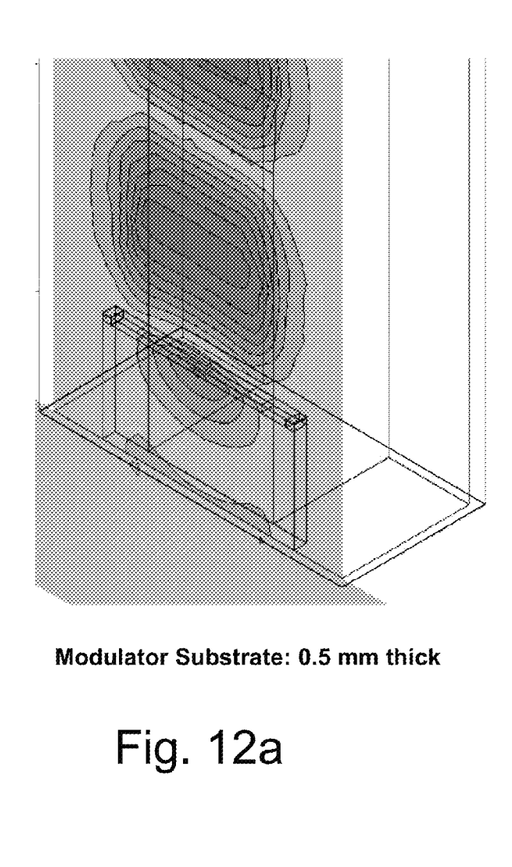
FIGS. 12a and 12b depict simulated standing wave electric field magnitudes for modulator substrates of, respectively, 0.5 mm and 0.25 mm thickness.
Figure 12B:
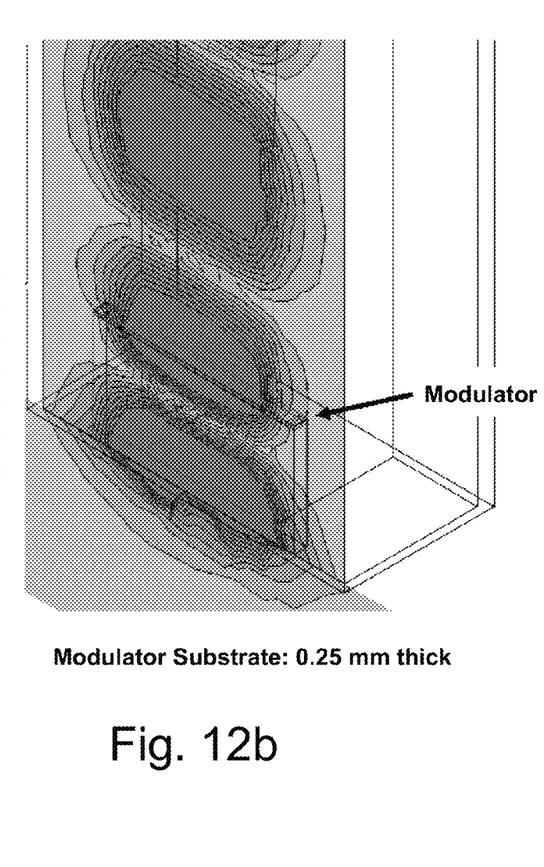

The thickness of the electro-optic modulator 16 substrate (see also FIG. 2a) is important for proper operation of the front-end assembly of either embodiment. Since the width of the ridge 12 of the ridged waveguide 14 is on the order of one cm for X-band operation, at 10 GHz, a one cm long modulator substrate having a dielectric constant of 2.25 would be approximately one-half of a wavelength. This could lead to cavity modes in the modulator substrate that could lead to a non-uniform field across the optical waveguide. It turns out that this effect can be mitigated by thinning the substrate of modulator 16. This is shown in FIG. 11 for a one cm long x-cut lithium niobate modulator substrate ($\in_r$=42) for the geometry of FIG. 1 for dielectric fills of Eccostock® FFP and HT0003. The graphs of field uniformity along the modulator are from the center of the ridged waveguide to the edge of the ridged waveguide. The distance from the center of the X-band WR90 waveguide to the edge is normalized by 1.143 cm (0.45") half the width of the waveguide 10. Half of the modulator extends from the center of the waveguide for 0.5 cm. FIG. 12 shows the simulated electric field magnitude along the top of the ridge for 0.25 mm and 0.5 mm thick modulator substrates in the ridged waveguide structure of FIG. 1. The drop in the field for a 0.25 mm thick lithium niobate substrate is about 40% for the Eccostock HT0003 dielectric fill.

Lithium niobate ($LiNbO_3$) or other high dielectric constant electro-optic material is preferably used as the modulator 16 substrate material in order to maintain a uniform electric field across the integrated optic waveguide formed in that electro-optic modulator substrate, for optimum signal conversion from RF to optical frequencies via the electro-optic effect.

FIGS. 12a and 12b depict simulated standing wave electric field magnitudes for modulator substrates of, respectively, 0.5 mm and 0.25 mm thickness. The field at the standing wave antinode is more uniform across the modulator for a $LiNbO_3$ thickness of 0.25 mm than for the thickness of 0.5 mm.

The dielectric filler 18 preferably has a dielectric constant approximately the same as the dielectric constant of the optical fibers 21 pigtailed to the electro-optic modulator 16.

The waveguiding portion of the waveguide 10 decreases in size in the preferred embodiments using a ridged waveguide taper transition element 12, but instead of using a separate taper 12 disposed within the waveguide, the size of the waveguide 10 itself could reduce from its input end to its distal end thereby forming a receiving space for receiving the electro-optic modulator 16 disposed entirely within that receiving space.

It should be understood that the above-described embodiments are merely some possible examples of implementations of the presently disclosed technology, set forth for a clearer understanding of the principles of this disclosure. Many variations and modifications may be made to the above-described embodiments of the invention without departing substantially from the principles of the invention. All such modifications and variations are intended to be included herein within the scope of this disclosure and the present invention and protected by the following claims.

What is claimed is:

1. A waveguide assembly comprising:
   a. a waveguide having an input end and a distal end;
   b. a tapered electrically conductive structure in said waveguide, the tapered electrically conductive structure tapering in thickness from a first end of the tapered electrically conductive structure where the tapered electrically conductive structure has a minimal impact on an interior height of said waveguide to a second end of the tapered electrically conductive structure where the tapered electrically conductive structure has a height which nearly fills, but does not completely fill, said waveguide, to thereby define a modulator receiving space between said tapered electrically conductive structure and an adjacent wall of said waveguide, the second end of the tapered electrically conductive structure being disposed immediately adjacent said distal end of said waveguide; and
   c. an electro-optic modulator disposed on dielectric material, the dielectric material being at least partially disposed within said modulator receiving space.

2. The waveguide assembly of claim 1 wherein the distal end is an open-circuited end of the waveguide assembly.

3. The waveguide assembly of claim 1 wherein the waveguide is formed of two metallic portions.

4. The waveguide assembly of claim 1 wherein the tapered electrically conductive structure is made of a dielectric material covered with an electrically conductive surface.

5. The waveguide assembly of claim 1 wherein the tapered electrically conductive structure is made of solid metal.

6. The waveguide assembly of claim 1 wherein the waveguide is a rectangular waveguide, wherein the tapered electrically conductive structure has a width which is smaller than an interior width of said waveguide and wherein the tapered electrically conductive structure is centered widthwise within said rectangular waveguide with sides of the tapered electrically conductive structure being spaced from side walls of said rectangular waveguide.

7. The waveguide assembly of claim 1 wherein a dielectric filler material has a taper which corresponds to a taper of said tapered electrically conductive structure and wherein the dielectric filler material is disposed in said waveguide so that its taper is positioned immediately adjacent the taper of the tapered electrically conductive structure.

8. The waveguide assembly of claim 7 wherein the waveguide is a rectangular waveguide, wherein the dielectric filler material has a width which is smaller than an interior width of said rectangular waveguide, but wider than a width of tapered electrically conductive structure which is centered widthwise within said rectangular waveguide with sides of the tapered electrically conductive structure being spaced from side walls of said rectangular waveguide.

9. The waveguide assembly of claim 7 wherein the dielectric filler material has a second taper presenting a leading edge directed towards the input end of the waveguide and centered in the waveguide near the input end of the waveguide.

10. The waveguide assembly of claim 7 wherein the dielectric filler material has a dielectric constant, the dielectric constant of the dielectric filler material being different from and smaller than a dielectric constant of the electro-optic modulator.

11. The waveguide assembly of claim 10 wherein the dielectric filler material has a second taper presenting a sharp nose directed towards the input end of waveguide.

12. The waveguide assembly of claim 1 wherein the electro-optic modulator being disposed at an antinode of a standing wave occurring in said the waveguide assembly when the waveguide assembly is placed in use.

13. The waveguide assembly of claim 1 wherein said tapered electrically conductive structure is formed of the same material as said waveguide.

14. The waveguide assembly of claim 1 wherein said tapered electrically conductive structure is formed of the same material as said waveguide and integrally therewith.

15. A waveguide assembly comprising:
a waveguide having an input end and a distal end, the waveguide having a waveguiding space which decreases in height from the input end to the distal end, the waveguiding space at the distal end of the waveguide having dimensions defining a receiving space for receiving an electro-optic modulator disposed entirely within said receiving space and wherein the distal end is an open-circuited end of the waveguide assembly.

16. The waveguide assembly of claim 15 wherein the waveguide decreases in height by means of a tapered electrically conductive structure being disposed within said waveguide.

17. The waveguide assembly of claim 15 wherein the waveguide decreases in height by means of a tapered electrically conductive surface located internally of said waveguide.

* * * * *